US012189239B2

(12) United States Patent
Dong et al.

(10) Patent No.: US 12,189,239 B2
(45) Date of Patent: Jan. 7, 2025

(54) BACKLIGHT MODULE AND LIQUID CRYSTAL DISPLAY APPARATUS

(71) Applicants: HEFEI BOE DISPLAY TECHNOLOGY CO., LTD., Anhui (CN); BOE TECHNOLOGY GROUP CO., LTD., Beijing (CN)

(72) Inventors: Wenbo Dong, Beijing (CN); Chaoyue Wang, Beijing (CN); Wei Zhang, Beijing (CN); Chao Li, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/768,411

(22) PCT Filed: Mar. 9, 2021

(86) PCT No.: PCT/CN2021/079819
§ 371 (c)(1),
(2) Date: Apr. 12, 2022

(87) PCT Pub. No.: WO2021/218407
PCT Pub. Date: Nov. 4, 2021

(65) Prior Publication Data
US 2024/0118573 A1    Apr. 11, 2024

(30) Foreign Application Priority Data
Apr. 29, 2020  (CN) .......................... 202020691717.6

(51) Int. Cl.
*G02F 1/13357*  (2006.01)
*F21V 8/00*  (2006.01)

(52) U.S. Cl.
CPC ....... *G02F 1/13362* (2013.01); *G02B 6/0041* (2013.01)

(58) Field of Classification Search
None
See application file for complete search history.

(56) References Cited

U.S. PATENT DOCUMENTS

| 10,598,985 B1* | 3/2020 | Chen ................. G02F 1/136277 |
| 2007/0070275 A1 | 3/2007 | Daiku |
| 2011/0299010 A1 | 12/2011 | Park et al. |
| 2012/0154711 A1 | 6/2012 | Park et al. |

(Continued)

FOREIGN PATENT DOCUMENTS

| CN | 1971369 A | 5/2007 |
| CN | 102087437 A | 6/2011 |

(Continued)

*Primary Examiner* — Ashok Patel
(74) *Attorney, Agent, or Firm* — IP & T GROUP LLP (57) ABSTRACT

An edge-lit backlight module (7) includes a light guide plate (71), at least one polarizer (72) and at least one light source (73). The light guide plate (71) has side faces (71a). A polarizer (72) is disposed opposite to a side face (71a) of the light guide plate (71). A light source (73) is disposed on a side of a polarizer (72) away from the light guide plate (71). The at least one polarizer (72) is configured to convert light emitted from a light source (73) disposed on a side of the polarizer away from the light guide plate to the light guide plate (71) into linearly polarized light.

19 Claims, 10 Drawing Sheets

(56) References Cited

U.S. PATENT DOCUMENTS

| | | | |
|---|---|---|---|
| 2013/0106922 A1 | 5/2013 | Chen et al. | |
| 2015/0346553 A1 | 12/2015 | Chen et al. | |
| 2018/0046023 A1* | 2/2018 | Kim | G02B 6/005 |
| 2018/0173052 A1 | 6/2018 | Shinohara et al. | |

FOREIGN PATENT DOCUMENTS

| | | |
|---|---|---|
| CN | 202132807 U | 2/2012 |
| CN | 102495495 A | 6/2012 |
| CN | 103968306 A | 8/2014 |
| CN | 104730768 A | 6/2015 |
| CN | 105425464 A | 3/2016 |
| CN | 105974668 A | 9/2016 |
| CN | 106773299 A | 5/2017 |
| CN | 108227278 A | 6/2018 |
| CN | 109683392 A | 4/2019 |
| CN | 212181215 U | 12/2020 |
| DE | 19963915 A1 | 8/2001 |
| WO | 2017/090358 A1 | 6/2017 |

* cited by examiner

BACKLIGHT MODULE AND LIQUID CRYSTAL DISPLAY APPARATUS

CROSS-REFERENCE TO RELATED APPLICATIONS

This application is a national phase entry under 35 USC 371 of International Patent Application No. PCT/CN2021/079819 filed on Mar. 9, 2021, which claims priority to Chinese Patent Application No. 202020691717.6, filed on Apr. 29, 2020, which are incorporated herein by reference in their entirety.

TECHNICAL FIELD

The present disclosure relates to the field of display technologies, and in particular, to a backlight module and a liquid crystal display apparatus.

BACKGROUND

A liquid crystal display (LCD) typically includes a liquid crystal display panel and a backlight module (also referred to as a backlight source) for providing backlight for the liquid crystal display panel. Edge-lit backlight modules are lighter and thinner than direct-lit backlight modules, and thus the edge-lit backlight modules are mostly used in small- and medium-sized products such as mobile phones, notebook computers and desktop computers. In addition, the edge-lit backlight modules are also used in some large-sized products such as large-sized televisions (TVs).

SUMMARY

In an aspect, an edge-lit backlight module is provided. The edge-lit backlight module includes a light guide plate, at least one polarizer and at least one light source. The light guide plate has side faces. A polarizer is disposed opposite to a side face of the light guide plate. A light source is disposed on a side of the polarizer away from the light guide plate.

The at least one polarizer is configured to convert light emitted from a light source disposed on a side of the polarizer away from the light guide plate to the light guide plate into linearly polarized light.

In some embodiments, the polarizer is fixed on the side face of the light guide plate.

In some embodiments, the edge-lit backlight module further includes at least one lamp cover covering a light-emitting side of a light source. A lamp cover includes a transparent plate opposite to a light source covered by the lamp cover, and a connecting portion connecting the transparent plate with the light source. The transparent plate includes an inner side surface proximate to the light source and an outer side surface away from the light source, and a polarizer disposed between the light guide plate and the light source covered by the lamp cover is fixed on the inner side surface or the outer side surface of the transparent plate.

In some embodiments, the polarizer is one of an iodine-based polarizer, a dye-based polarizer or a metal wire grid polarizer.

In some embodiments, in a case where the polarizer is the iodine-based polarizer or the dye-based polarizer, the polarizer is adhered to the side face of the light guide plate through a first adhesive layer, and a material of the first adhesive layer includes a heat dissipation material.

In some embodiments, the polarizer is the iodine-based polarizer or the dye-based polarizer, and an orthographic projection of the side face of the light guide plate on a plane where the polarizer is located is within a range of a contour of the polarizer.

In some embodiments, an orthographic projection of the contour of the polarizer on a plane where the side face of the light guide plate is located substantially coincides with a contour of the side face of the light guide plate.

In some embodiments, in a direction perpendicular to an edge of the side face of the light guide plate, the edge of the side face of the light guide plate and an edge proximate thereto of the polarizer have a distance therebetween.

In some embodiments, the distance between the edge of the side face of the light guide plate and the edge proximate thereto of the polarizer is greater than or equal to 0.2 mm.

In some embodiments, in a case where the polarizer is an iodine-based polarizer or a dye-based polarizer, the polarizer is adhered to the inner side surface or the outer side surface of the transparent plate of the lamp cover through a second adhesive layer, and a material of the second adhesive layer includes a heat dissipation material.

In some embodiments, in a case where the polarizer is the metal wire grid polarizer, the metal wire grid polarizer is a metal pattern layer disposed on the side face of the light guide plate.

In some embodiments, the edge-lit backlight module further includes at least one lamp cover covering a light-emitting side of a light source and a lamp cover includes a transparent plate opposite to the light source; in a case where the polarizer is a metal wire grid polarizer, the metal wire grid polarizer is a metal pattern layer disposed on the inner side surface or the outer side surface of the transparent plate of the lamp cover.

In some embodiments, the polarizer is a metal wire grid polarizer, and the metal wire grid polarizer is a metal wire grid polarizing plate adhered to the side face of the light guide plate.

In some embodiments, the light guide plate includes a light guide plate body and a plurality of scattering particles dispersedly disposed in the light guide plate body, and the plurality of scattering particles are configured to scatter light.

In some embodiments, a particle size of at least one scattering particle is in a range of 1 nm to 100 nm, inclusive.

In some embodiments, a material of the plurality of scattering particles includes one or more of a metal material, a metal compound material or a nano-polymeric material.

In some embodiments, the light guide plate is transparent.

In some embodiments, the light emitted from the light source is collimated light, and a propagation direction of the collimated light is parallel to a light-emitting surface of the light guide plate.

In another aspect, a liquid crystal display apparatus is provided. The liquid crystal display apparatus includes the edge-lit backlight module as described in any of the above embodiments, a liquid crystal display panel and a polarization analyzer. The polarization analyzer is disposed on a side of the liquid crystal display panel away from the edge-lit backlight module.

A transmission axis of the polarizer is perpendicular to or parallel to a transmission axis of the polarization analyzer.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" or "the plurality of" means two or more unless otherwise specified.

In the description of some embodiments, the expressions "connected" and its extensions may be used. For example, the term "connected" may be used in the description of some embodiments to indicate that two or more components are in direct physical or electrical contact with each other.

As used herein, the term such as "about" or "approximately" includes a stated value and an average value within an acceptable range of deviation of a particular value. The acceptable range of deviation is determined by a person of ordinary skill in the art in view of measurement in question and errors associated with the measurement of a particular quantity (i.e., the limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

When a transparent display apparatus is in an operating state, an image (also referred to as a frame or a picture) can be displayed, so that a viewer can see the image displayed by the transparent display apparatus and a real scene (e.g., an object placed there, a passers-by, etc.) on a side of the transparent display apparatus facing away from the viewer. When the transparent display apparatus is in a non-operating state, it is in a transparent or semi-transparent state, like a piece of glass, so that the viewer can see a real scene on the side of the transparent display apparatus facing away from the viewer through the transparent display apparatus. With the development of display industries, the transparent display apparatus has gradually been used more widely. For example, the transparent display apparatus may be applied to vehicle-mounted displays, window displays, shopping mall advertisements, museum displays, refrigerator doors, building media, etc.

Figure 1:
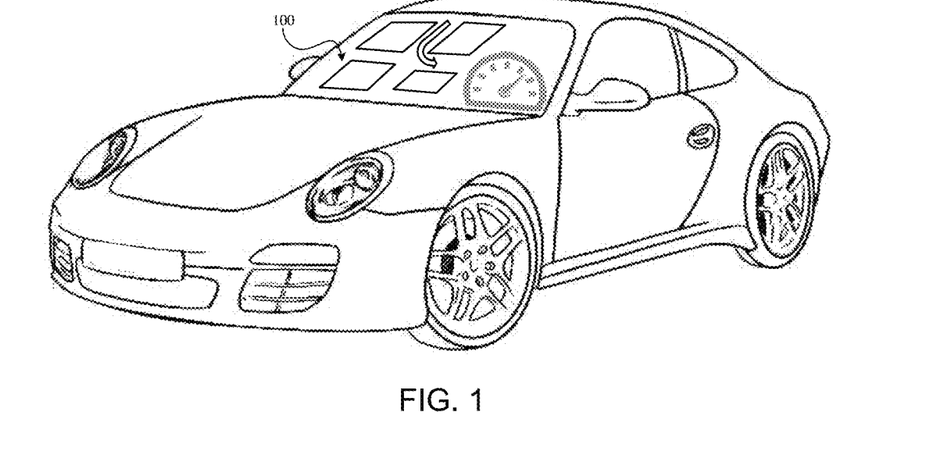
FIG. 1 is a structural diagram of a transparent display apparatus applied to an automobile window, in accordance with some embodiments of the present disclosure.

In some embodiments, as shown in FIG. 1, the transparent display apparatus 100 may be applied to an automobile window. For example, a portion or a whole of a front windshield may be replaced with the transparent display apparatus, or the transparent display apparatus 100 may be attached to the front windshield to cover a portion or a whole of the front windshield. The portion of the front windshield is replaced with the transparent display apparatus, which means embedding the transparent display apparatus 100 in an opening provided in the front windshield. FIG. 1 shows a case where the transparent display apparatus 100 is embedded in a window frame of a front window of an automobile. In this case, the transparent display apparatus 100 can not only function as the front windshield, but also display an image. In a case where the transparent display apparatus is applied to the front window of the automobile, as shown in FIG. 1, information on a dashboard of the automobile, navigation information on a map, etc. can be displayed on the front window of the automobile, so that a driver can see a road ahead while viewing the dashboard and the map, thereby providing the driver with a good driving experience.

Figure 2:
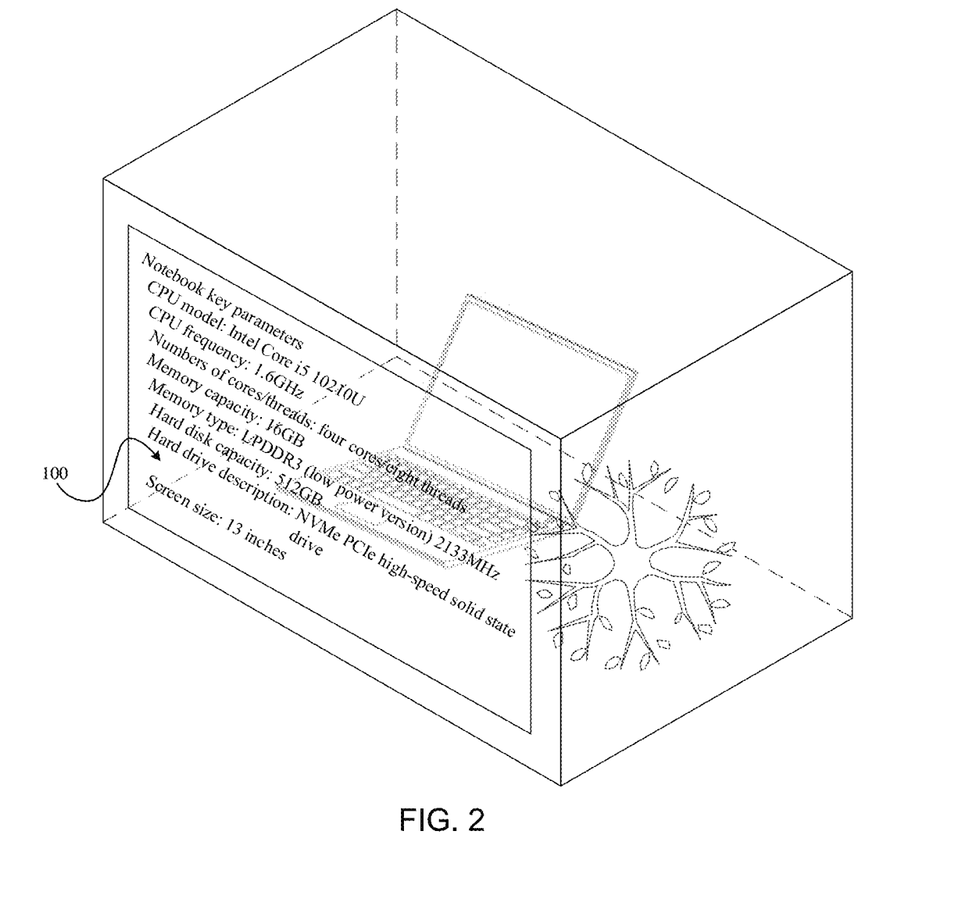
FIG. 2 is a structural diagram of a transparent display apparatus applied to a window display cabinet, in accordance with some embodiments of the present disclosure.

In some other embodiments, as shown in FIG. 2, the transparent display apparatus 100 may be applied to a window display cabinet (also referred to as a display cabinet), which includes a box and the transparent display apparatus 100 disposed on a side of the box. The box has a certain accommodating space for accommodating an item to be displayed. A surface of the window display cabinet provided with the transparent display apparatus 100 may be referred to as a display surface. In FIG. 2, considering an example in which the item to be displayed is a notebook computer, the display surface of the window display cabinet may display information such as a parameter, a price and an application scene of the item to be displayed, so that the viewer can have a deep understanding of the product (i.e., the notebook computer). In addition, at least a portion of an inner side surface of the box may be set to be white. In this way, a part of light scattered to the accommodating space of the box may be reflected by the inner side surface of the box onto the item to be displayed, so as to provide good ambient light for the item to be displayed; and another part of the light scattered to the accommodating space of the box may be emitted from the display surface through the transparent display apparatus 100, thereby improving brightness of the transparent display apparatus 100.

Figure 3:
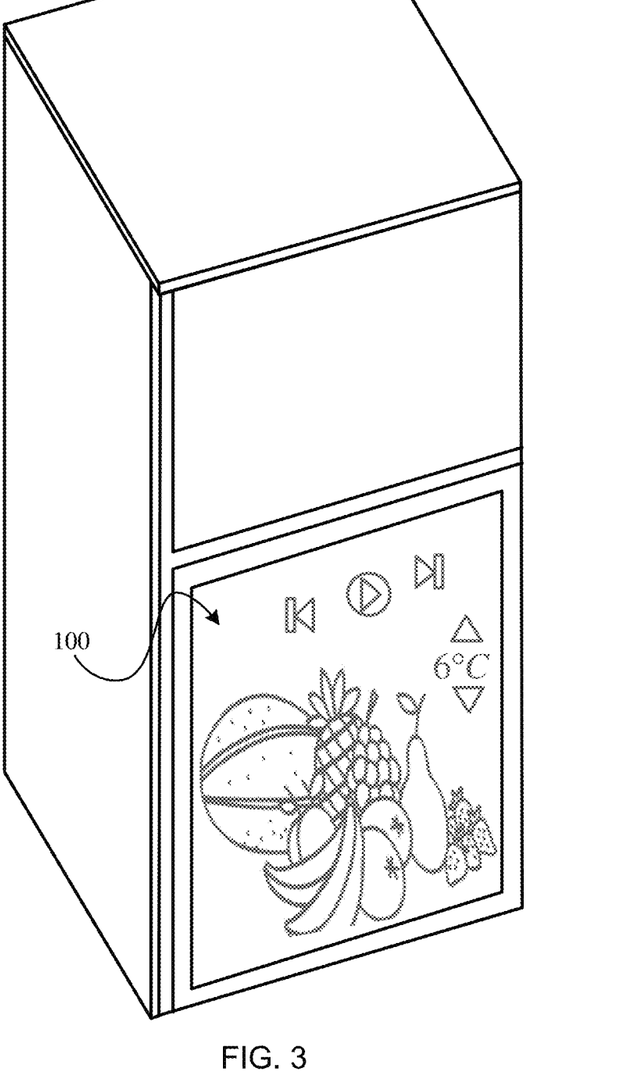
FIG. 3 is a structural diagram of a transparent display apparatus applied to a refrigerator door, in accordance with some embodiments of the present disclosure.

In yet some other embodiments, as shown in FIG. 3, a refrigerator door may be provided with an opening or a recess thereon, and the transparent display apparatus 100 may be disposed in the opening or the recess. In addition, at least one of a touch structure and an audio player may be integrated into the transparent display apparatus 100. Moreover, a human-computer interaction interface may be displayed on the transparent display apparatus, a user can operate on the transparent display apparatus through the human-computer interaction interface, and the transparent display apparatus can sense the user's operation through the touch structure. For example, a temperature set by the user and a temperature adjustment image are displayed on the transparent display apparatus, and the user can adjust a set temperature by pressing the temperature adjustment image. In addition, a control interface of the audio player may be displayed on the transparent display apparatus, and the user can operate on the control interface to turn on the audio player to play audios, thereby expanding an application scope of the transparent display apparatus.

The transparent display apparatus may be a transparent liquid crystal display apparatus. The liquid crystal display apparatus includes a plurality of pixels, and each pixel may include a plurality of sub-pixels with different colors. For example, each pixel includes a red (R) sub-pixel, a green (G) sub-pixel and a blue (B) sub-pixel, and may further include a white (W) sub-pixel. As a result, gray scales of the sub-pixels with different colors are controlled to display a colorful image. Of course, the liquid crystal display apparatus may only support the display of black-and-white images (e.g., may only display colors corresponding to 256 gray scales from black to white).

Hereinafter, a display principle of the liquid crystal display apparatus will be described.

In the liquid crystal display apparatus, natural light emitted from a backlight module is converted into linearly polarized light after passing through a polarizer, and the linearly polarized light is changed into elliptically polarized light or circularly polarized light after passing through a liquid crystal layer having an optical rotation effect. And then, the elliptically polarized light or the circularly polarized light passes through a polarization analyzer, and part of the elliptically polarized light or the circularly polarized light, a polarization direction of which is the same as a direction of a transmission axis (i.e., a polarization orientation) of the polarization analyzer, exits. For a sub-pixel, a degree of optical rotation of a portion of the liquid crystal layer located in the sub-pixel depends on a magnitude of an electric field applied thereon. As the applied electric field changes, a degree of optical rotation to the linearly polarized light also changes, and thus a gray scale displayed by the sub-pixel also changes. In addition, if color display needs to be realized, color filter plates (also referred to as color filter films) are further provided on light paths through which light emitted from the backlight module passes. For example, the color filter plates are provided between the liquid crystal layer and the polarization analyzer, or between the polarizer and the liquid crystal layer, so that different sub-pixels in a pixel can emit light with different colors.

Figure 4:
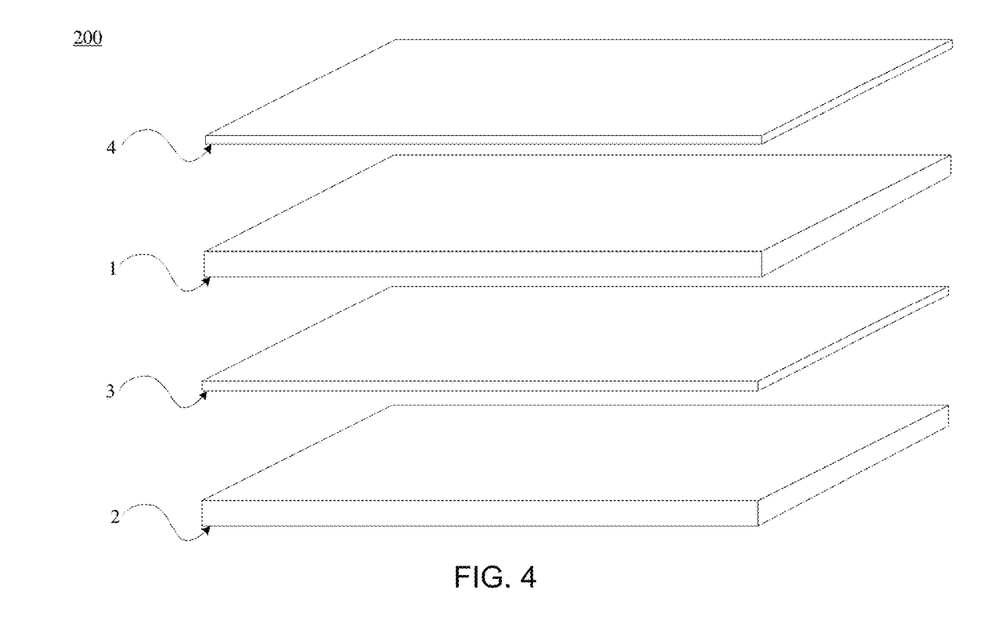
FIG. 4 is a structural diagram of a liquid crystal display apparatus, in accordance with some embodiments of the related art.

As shown in FIG. 4, in the related art, the transparent liquid crystal display apparatus 200 is provided, which includes a backlight module 2, a lower polarizer 3, a liquid crystal display panel 1 and an upper polarizer 4 that are stacked. Due to an polarization effect of the lower polarizer 3, light incident on the liquid crystal display panel through the lower polarizer 3 from the backlight module 2 in the liquid crystal display apparatus 200 is caused to be lost by more than 50%; and besides, light passing through the liquid crystal display panel 1 and the upper polarizer 4 is also lost by a part, and thus a transmittance of the light emitted from the backlight module 2 in the liquid crystal display apparatus 200 is only in a range of approximately 7% to approximately 9%. For a transparent liquid crystal display apparatus 200, the viewer generally wants to see the real scene behind the liquid crystal display apparatus 200. However, light scattered by the real scene needs to pass through the whole liquid crystal display apparatus 200. It will be expected that, a transmittance of the light scattered by the real scene is lower than that of the light emitted from the backlight module 2. As a result, the viewer cannot see the image behind the liquid crystal display apparatus 200 clearly through the liquid crystal display apparatus 200, and an effect of transparent display is poor.

In the related art, an increase of a light transmittance of the liquid crystal display apparatus 200 mainly relies on increasing light transmittances of materials of components (e.g., a glass substrate in the liquid crystal display panel 1 and a light guide plate in the backlight module 2) in the liquid crystal display apparatus 200. However, the light transmittances of the existing materials used in the components in the liquid crystal display apparatus 200 each almost reaches a limit, and measure(s) for improving the light transmittances of the materials have a small increase in the light transmittance of the liquid crystal display apparatus 200, generally approximately 2% to approximately 4%. In addition, the measure(s) for increasing the light transmittances cause a huge increase in the cost of the product, which has a poor practical application significance.

Figure 5:
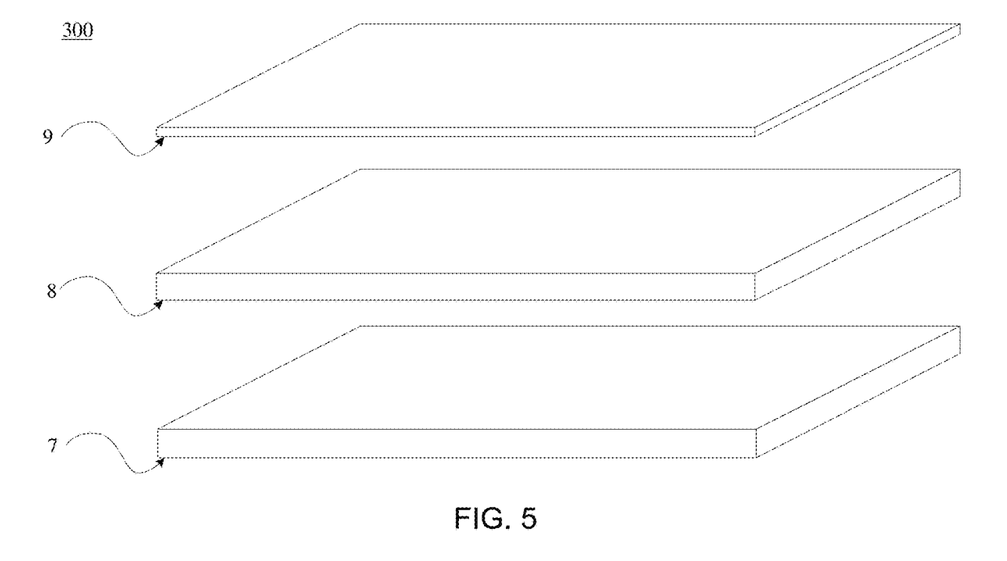
FIG. 5 is a structural diagram of a liquid crystal display apparatus, in accordance with some embodiments of the present disclosure.
Figure 12A:
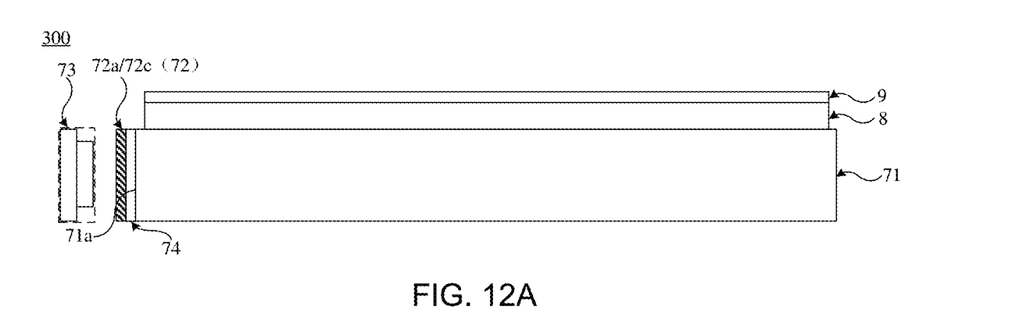
FIG. 12A is a structural diagram of a liquid crystal display apparatus, in accordance with some embodiments of the present disclosure.

In order to solve the above problems, as shown in FIGS. 5 and 12A, some embodiments of the present disclosure provide a liquid crystal display apparatus 300, which includes an edge-lit backlight module 7, a liquid crystal display panel 8, and a polarization analyzer 9 disposed on a side of the liquid crystal display panel 8 away from the edge-lit backlight module 7. As shown in FIG. 12A, an orthographic projection of the liquid crystal display panel 8 on the edge-lit backlight module 7 is within edges of a light guide plate 71 in the edge-lit backlight module 7.

The edge-lit backlight module 7 provides linearly polarized light for the liquid crystal display panel 8. A polarization direction of the linearly polarized light and a direction of a transmission axis of the polarization analyzer 9 (also referred to as a polarization orientation) are perpendicular or parallel to each other, so as to satisfy display requirements of the liquid crystal display apparatus 300. In some embodiments, as shown in FIG. 6, the liquid crystal display panel 8 includes a display substrate 81 (also referred to as an array substrate), an opposite substrate 82, and a liquid crystal layer 83 disposed between the display substrate 81 and the opposite substrate 82.

Figure 6:
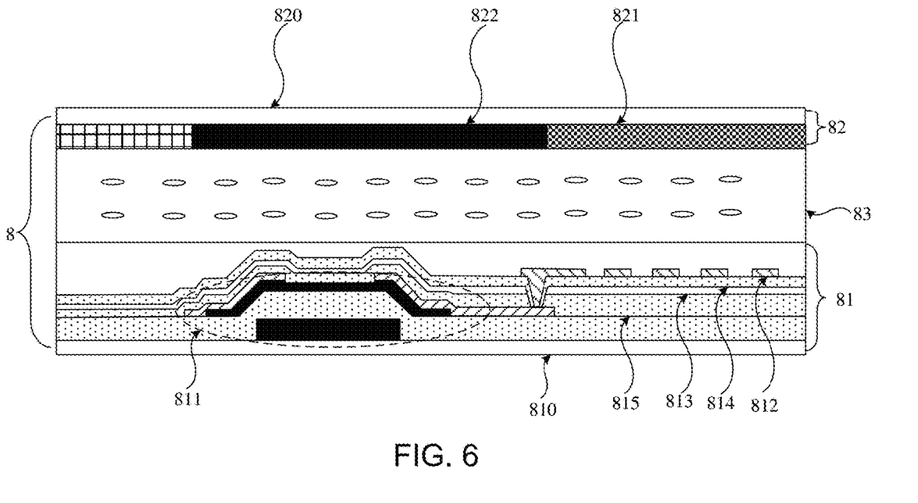
FIG. 6 is a structural diagram of a liquid crystal display panel, in accordance with some embodiments of the present disclosure.

In some embodiments, as shown in FIG. 6, the display substrate 81 includes a thin film transistor 811, a pixel electrode 812 and a common electrode 813 that are disposed on a first substrate 810. The pixel electrode 812 and the common electrode 813 may be disposed in different layers, and a liquid crystal display apparatus 300 is a fringe field switching (FFS) display apparatus or an advanced-super dimensional switching (AD-SDS or ADS) display apparatus. In this case, a first insulating layer 814 is provided between the pixel electrode 812 and the common electrode 813. In a case where the common electrode 813 is disposed between the thin film transistor 811 and the pixel electrode 812, as shown in FIG. 6, a second insulating layer 815 is provided between the common electrode 813 and the thin film transistor 811. In some other embodiments, the liquid crystal display apparatus 300 is an in-plane switching (IPS) display apparatus. For example, the pixel electrode 812 and the common electrode 813 may be disposed in the same layer. In this case, the pixel electrode 812 and the common electrode 813 each have a comb-tooth structure including a plurality of strip-shaped sub-electrodes.

In some other embodiments, the liquid crystal display apparatus 300 is a twisted nematic (TN) display apparatus. In this case, the common electrode 813 is disposed on the opposite substrate 82.

As shown in FIG. 6, the opposite substrate 82 includes a second substrate 820 and a color filter layer 821 disposed on the second substrate 820. In this case, the opposite substrate 82 may also be referred to as a color filter (CF) substrate. The color filter layer 821 includes at least a plurality of filter units, and the plurality of filter units are located in a plurality of sub-pixels in one-to-one correspondence. The plurality of filter units include a filter unit of a first color, a filter unit of a second color and a filter unit of a third color. The first color, the second color and the third color are three primary colors, such as red, green and blue. The opposite substrate 82 further includes a black matrix pattern 822 disposed on the second substrate 820, and the black matrix pattern 822 is used to space the plurality of filter units apart.

In some other embodiments, the color filter layer 821 may also be disposed on the first substrate 810 as a component of the display substrate 81. In this case, the liquid crystal display apparatus 300 may not be provided with the black matrix pattern 822 therein.

Figure 7:
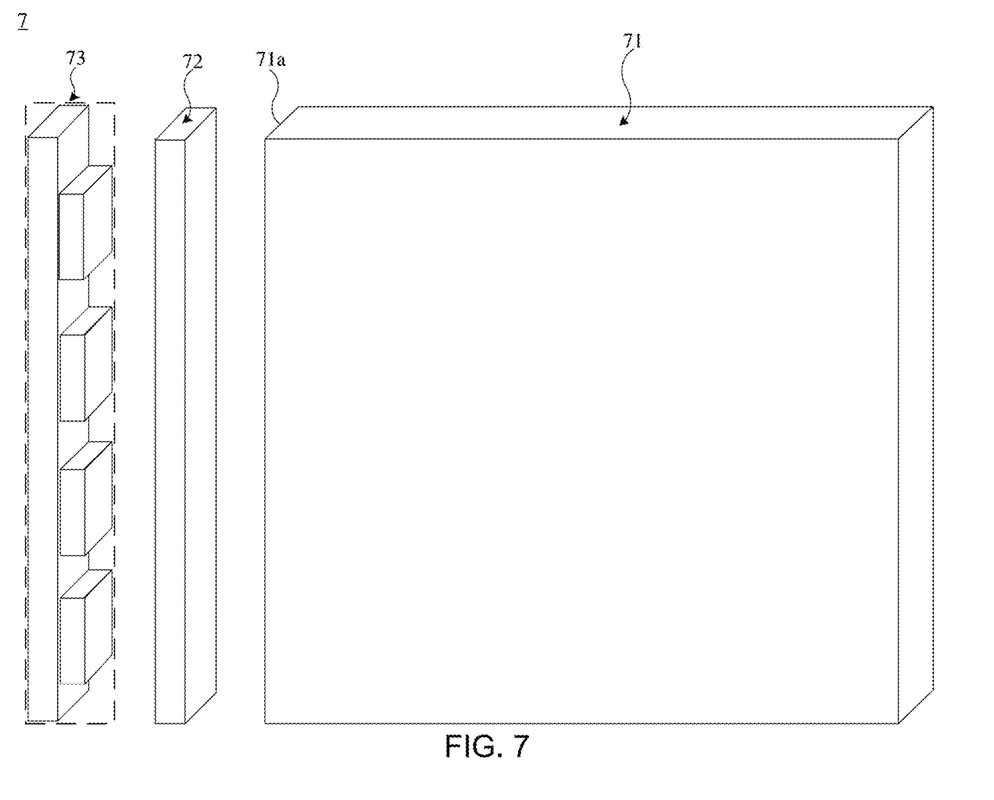
FIG. 7 is a structural diagram of a backlight module, in accordance with some embodiments of the present disclosure.
Figure 8:
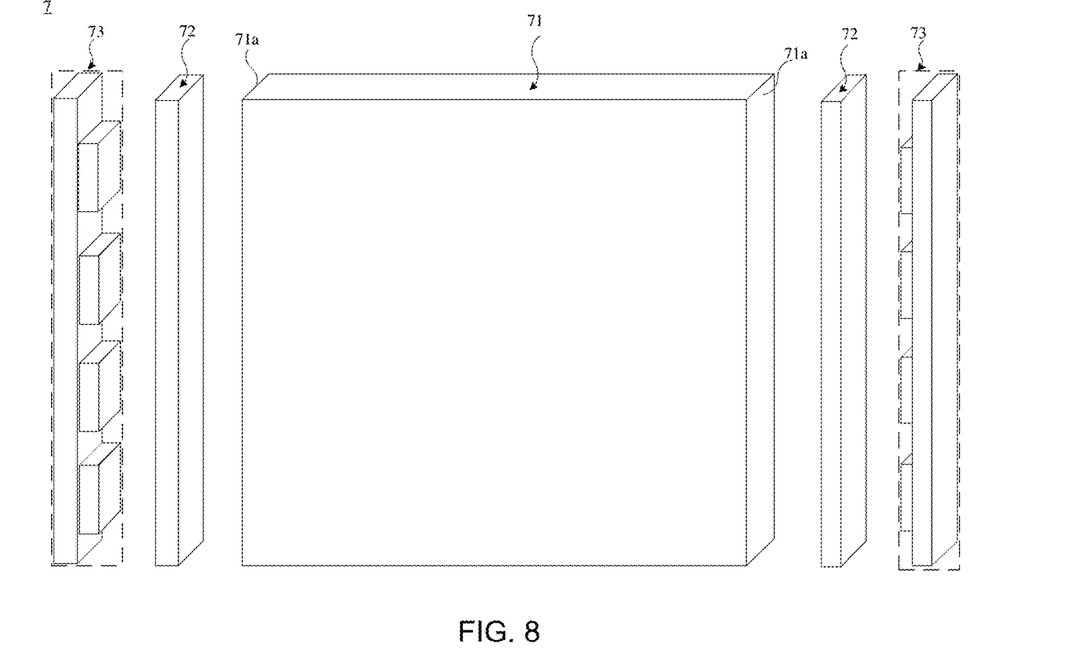
FIG. 8 is a structural diagram of another backlight module, in accordance with some embodiments of the present disclosure.

As shown in FIGS. 7 and 8, some embodiments of the present disclosure provide the edge-lit backlight module 7, which includes the light guide plate 71, polarizer(s) 72 and light source(s) 73. The light guide plate 71 has side faces 71a, a polarizer 72 is arranged opposite to a side face 71a of the light guide plate 71, and a light source 73 is disposed on a side of a polarizer 72 away from the light guide plate 71. The polarizer(s) 72 are each configured to convert light emitted from a light source 73 into the linearly polarized light.

Figure 9A:
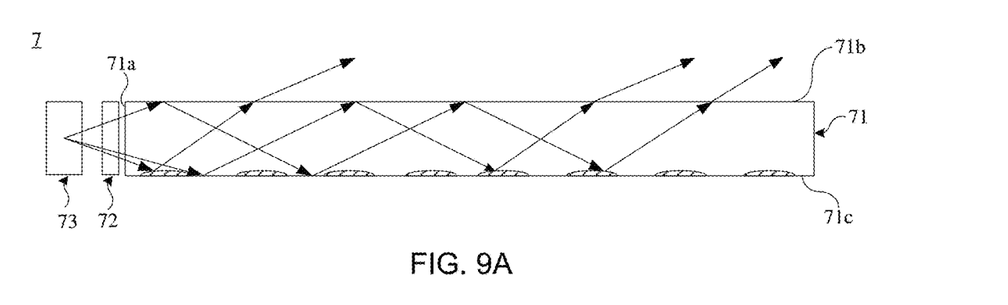
FIG. 9A is an operating principle diagram of a backlight module, in accordance with some embodiments of the present disclosure.
Figure 9B:
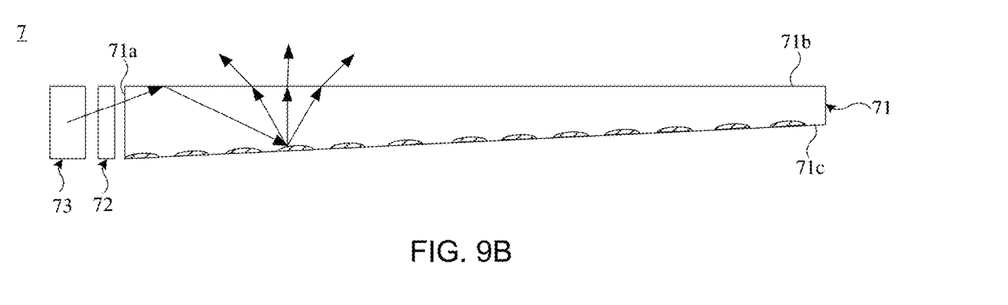
FIG. 9B is an operating principle diagram of another backlight module, in accordance with some embodiments of the present disclosure.
Figure 9C:
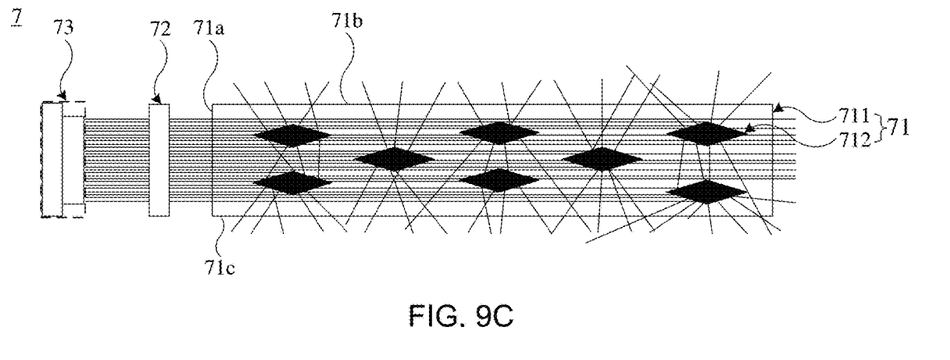
FIG. 9C is an operating principle diagram of yet another backlight module, in accordance with some embodiments of the present disclosure.

It will be understood that, as shown in FIGS. 9A, 9B and 9C, the light guide plate 71 includes a first bottom surface 71b and a second bottom surface 71c that are arranged opposite to each other, and the side faces 71a connecting the first bottom surface 71b and the second bottom surface 71c. The first bottom surface 71b is a light-emitting surface of the light guide plate 71, i.e., a surface closer to the liquid crystal display panel than the second bottom surface 71c. The first bottom surface 71b may be in a shape of a rectangle, and in this case, the light guide plate 71 has four side faces 71a.

For example, the edge-lit backlight module 7 shown in FIG. 7 includes a single polarizer 72 and a single light source 73, and the single polarizer 72 is arranged opposite to a side face 71a. The edge-lit backlight module 7 shown in FIG. 8 includes two polarizers 72 and two light sources 73, and each polarizer 72 and a corresponding light source 73 correspond to one of two mutually parallel side faces 71a of the light guide plate 71, and an arrangement of each polarizer 72 and the corresponding light source 73 can be referred to FIG. 7.

As shown in FIGS. 9A, 9B and 9C, an operating principle of the light guide plate 71 is as follows: light incident from the side face 71a of the light guide plate 71 is distributed throughout the whole light guide plate 71 through a total internal reflection, and in order to make the light incident from the side face 71a exit from the first bottom surface 71b, the total internal reflection of light needs to be changed into diffuse reflection.

In some embodiments, referring to FIGS. 9A and 9B, light guide dots (also referred to as dots) may be provided on a side of the second bottom surface 71c proximate to the first bottom surface 71b, so as to change the total internal reflection of light into the diffuse reflection. In addition, the light guide plate 71 shown in FIG. 9A is in a shape of a flat plate, a section of which is in a shape of a rectangle. The light guide plate 71 shown in FIG. 9B is wedge-shaped, and a section of which is in a shape of a right-angled trapezoid.

In some other embodiments, referring to FIG. 9C, the light guide plate 71 includes a light guide plate body 711 and a plurality of scattering particles 712 dispersedly disposed in the light guide plate body 711, and the plurality of scattering particles 712 are configured to scatter light, so as to change the total internal reflection of light into the diffuse reflection.

It will be understood that FIG. 9C shows an example in which the light emitted from the light source 73 is collimated light parallel to the light-emitting surface 71b of the light guide plate 71. However, the light emitted from the light source 73 may also be divergent light with a certain divergence angle. In a case where the light emitted from the light source 73 is the collimated light, a large amount of light is incident on the light guide plate 71 through the polarizer 72, and a utilization rate of the light source 73 is high.

The scattering particles 712 are configured to scatter light. At least a part of light incident on surfaces of the scattering particles 712 deviates from original propagation directions thereof through the scattering particles 712, and exits from the light-emitting surface of the light guide plate 71. In some embodiments, a small amount of light that does not pass through the scattering particles 712 is allowed to exit from a side face 71a of the light guide plate 71 away from the light source 73 (the rightmost side face 71a of the light guide plate 71 in FIG. 9C).

Figure 10:
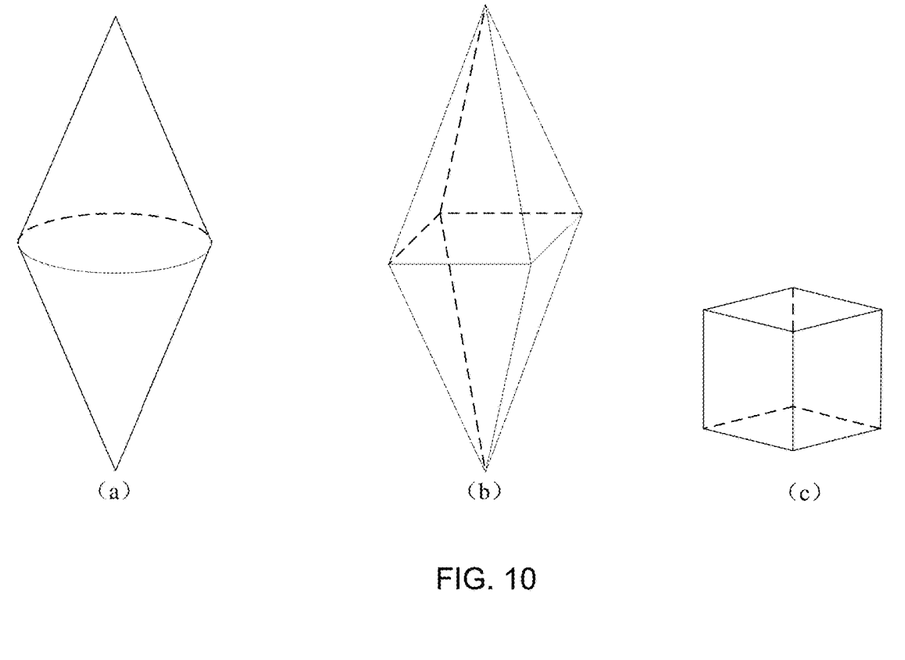
FIG. 10 is a structural diagram of scattering particles, in accordance with some embodiments of the present disclosure.

A shape of a scattering particle is not limited in some embodiments of the present disclosure. For example, as shown in (a) of FIG. 10, the shape of the scattering particle is a shape formed by jointing bottom surfaces of two circular cones having the same shape and the same size together. For another example, as shown in (b) of FIG. 10, the shape of the scattering particle is a regular octahedron, also regarded as a shape formed by jointing bottom surfaces of two right square pyramids having the same shape and the same size together. For yet another example, as shown in (c) of FIG. 10, the shape of the scattering particle is a quadrangular prism. Sections of the scattering particles 712 may each be in a shape of a rhombus. The light guide plate 71 composed of the light guide plate body 711 and the scattering particles 712 has a high light utilization rate and a good light scattering ability.

In some embodiments, a particle size of at least one scattering particle is in a range of 1 nm to 100 nm, inclusive. For example, the particle size of the scattering particle is 20 nm, 35 nm, 50 nm or 75 nm. Particle sizes of different scattering particles may be the same or different.

In some embodiments, a material of the plurality of scattering particles includes one or more of a metal material, a metal compound material or a nano-polymeric material.

In some embodiments, scattering particles may be added in the light guide plate 71 shown in FIG. 9A or 9B, so as to enhance a scattering effect of light.

In some embodiments, the light guide plate 71 is transparent.

On this basis, in the edge-lit backlight module 7 provided by some embodiments of the present disclosure, the polarizer 72 is provided between the light guide plate 71 and the light source 73, so that the edge-lit backlight module 7 may emit the linearly polarized light. The light emitted from the light source 73 changes to the linearly polarized light after passing through the polarizer 72. Since the light guide plate 71 is an amorphous solid, the linearly polarized light will not change its polarization properties when propagating inside the light guide plate 71. Therefore, in a case where the edge-lit backlight module 7 is applied to the liquid crystal display apparatus 300, the edge-lit backlight module 7 may provide the linearly polarized light for the liquid crystal display apparatus 300. As a result, in the liquid crystal display apparatus 300, instead of providing a first polarizer (i.e., a lower polarizer) proximate to the backlight module, it is only necessary to provide the polarization analyzer 9 away from the backlight module, so as to ensure normal operation of the liquid crystal display apparatus 300. In this way, the light transmittance of the liquid crystal display apparatus 300 may increase, thereby enabling the viewer to see the scene behind the liquid crystal display apparatus 300 more clearly while seeing an image displayed by the liquid crystal display apparatus 300.

In some embodiments, the polarizer 72 is one of an iodine-based polarizer, a dye-based polarizer and a metal wire grid polarizer.

In some embodiments of the present disclosure, the iodine-based polarizer and the dye-based polarizer are collectively referred to as polarizers. The polarizer includes a polyvinyl alcohol (PVA) layer provided in the middle, tri-cellulose acetate (TAC) layers each provided on both sides of the PVA layer, and a protective layer provided on a side of one of the TAC layers away from the PVA layer. The iodine-based polarizer is a polarizer in which the PVA layer and iodine molecules are combined, thereby easily obtaining optical properties such as a high transmittance and a high degree of polarization. The dye-based polarizer is a polarizer in which an organic dye having dichroism is absorbed into the PVA layer, thereby easily obtaining the good high temperature resistance and the good high humidity resistance. For example, the dye-based polarizer is a dichroic dye-based polarizer.

Figure 11:
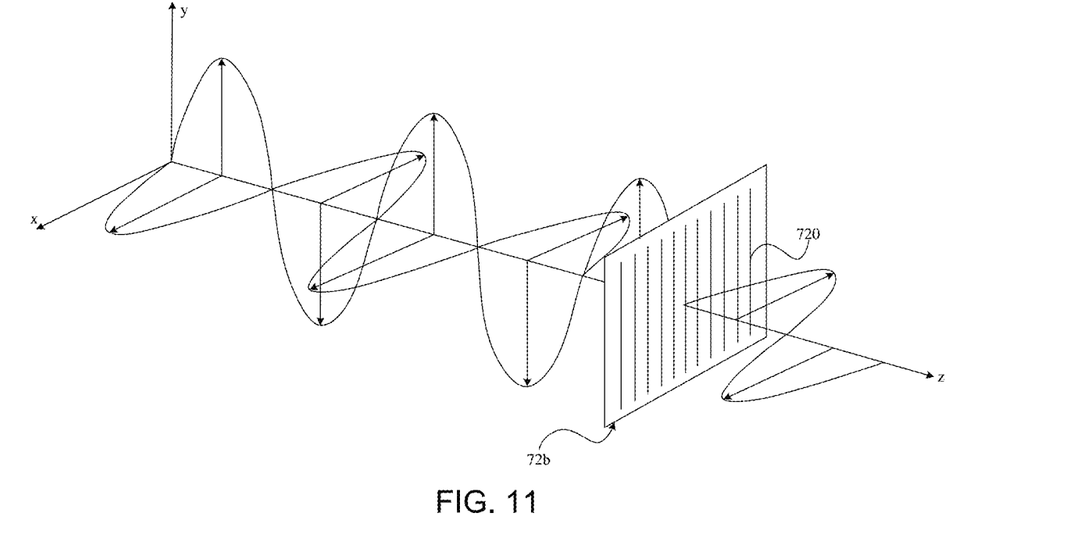
FIG. 11 is an operating principle diagram of a metal wire grid polarizer, in accordance with some embodiments of the present disclosure.

A principle of the metal wire grid polarizer 72b is that: as shown in FIG. 11, the metal wire grid polarizer includes a plurality of metal grid bars 720 that are parallel to each other, an extension direction of the metal grid bars 720 is a y-axis, and directions perpendicular to the extension direction of the metal grid bars 720 are an x-axis and a z-axis, and the x-axis and the z-axis are perpendicular to each other. The light emitted by the light source travels along a z-axis, and the light is divided into a part of polarized light with a direction of an electric field along the x-axis and another part of polarized light with a direction of an electric field along the y-axis. The part of polarized light with the direction of the electric field along the y-axis can excite electrons to oscillate along the y-axis, so that the part of polarized light is reflected. Alternatively, the electric field of the part of polarized light with the direction of the electric field along the y-axis drives free electrons on the metal grid bars 720 to move, so as to produce thermal energy due to collision of the free electrons. That is, energy of the part of polarized light is absorbed by the metal grid bars 720. The part of polarized light with the direction of the electric field along the x-axis cannot excite the electrons to oscillate along the x-axis, so that the part of polarized light passes through the metal wire grid polarizer. Alternatively, the electric field of the part of polarized light with the direction of the electric field along the x-axis cannot drive the free electrons on the metal grid bars 720 to move. That is, energy of the part of polarized light is not absorbed by the metal grid bars 720. Therefore, light passing through the metal wire grid polarizer 72b are only the part of polarized light with the direction of the electric field along the x-axis, which forms the linearly polarized light.

In a case where the polarizer 72 is the metal wire grid polarizer, a material used to manufacture the metal wire grid polarizer is not limited in some embodiments of the present disclosure. For example, the material may be a metal simple substance such as copper or iron, or a metal alloy.

In some embodiments, as shown in FIGS. 12A to 13B, the polarizer 72 is fixed on the side face 71a of the light guide plate 71. That is, relative positions of the polarizer 72 and the side face 71a of the light guide plate 71 do not move. Further, the polarizer 72 may be directly manufactured on the side face 71a of the light guide plate 71, for example, by using a patterning process. The polarizer 72 may also be adhered to the side face 71a of the light guide plate 71. The patterning process refers to a process in which a formed film is patterned to obtain a pattern layer. For example, the patterning process includes film forming, photoetching (including coating, mask exposure and development), etching, glue removing and other procedures.

Figure 13A:
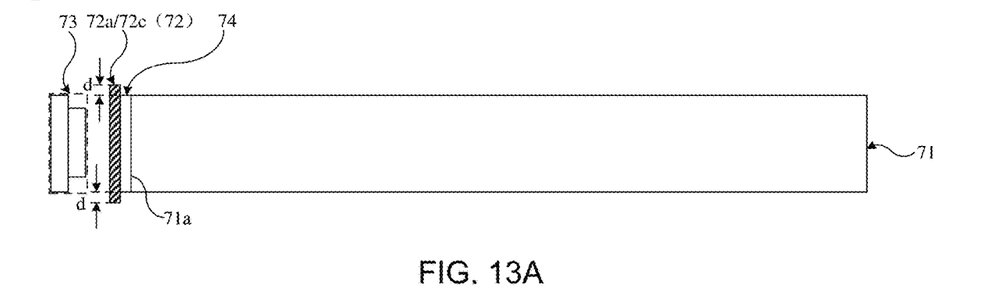
FIG. 13A is a structural diagram of yet another backlight module, in accordance with some embodiments of the present disclosure.

In some embodiments, in a case where the polarizer 72 is the iodine-based polarizer 72c or the dye-based polarizer 72a, as shown in FIGS. 12A and 13A, the polarizer 72 is adhered to the side face 71a of the light guide plate 71 through a first adhesive layer 74. The first adhesive layer 74 may include a heat dissipation material. For example, a material of the first adhesive layer 74 may be mainly composed of at least one of silica gel, silicone grease silica gel or silicone grease. Since the light source 73 generates heat while emitting light, and the silica gel, the silicone grease silica gel or the silicone grease has a heat dissipation effect, it is possible to avoid defects such as a warping of the polarizer 72 due to high temperature in a case where the edge-lit backlight module 7 operates for a long time.

In some embodiments, in a case where the polarizer 72 is the iodine-based polarizer 72c or the dye-based polarizer 72a, as shown in FIGS. 12A to 13B, an orthographic projection of a contour of the side face 71a (the side face 71a arranged opposite to the polarizer 72) of the light guide plate 71 on a plane where the polarizer 72 is located is within a range of a contour of the polarizer 72. That is, the polarizer 72 completely covers the side face 71a of the light guide plate 71, so as to ensure that all of light incident on the light guide plate 71 from the light source 73 through the polarizer 72 and the side face 71a of the light guide plate 71 is the linearly polarized light.

Figure 12B:
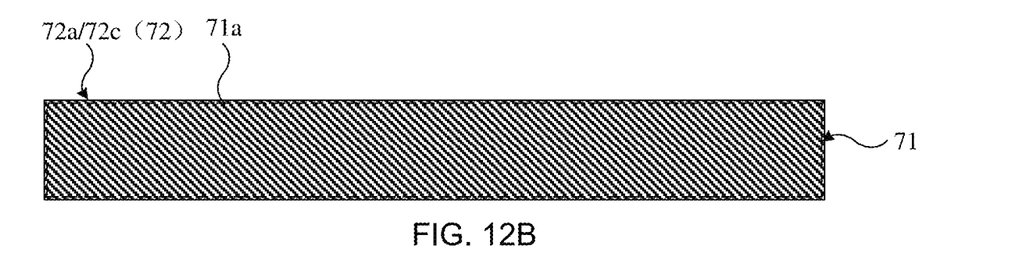
FIG. 12B is a structural diagram of a portion of the liquid crystal display apparatus in FIG. 12A, in accordance with some embodiments of the present disclosure.

Referring to FIGS. 12A and 12B, in a case where the polarizer 72 is the iodine-based polarizer 72c or the dye-based polarizer 72a, an orthographic projection of the contour of the polarizer 72 on a plane where the side face 71a of the light guide plate 71 is located coincides or substantially coincides with the contour of the side face 71a of the light guide plate 71.

Figure 13B:
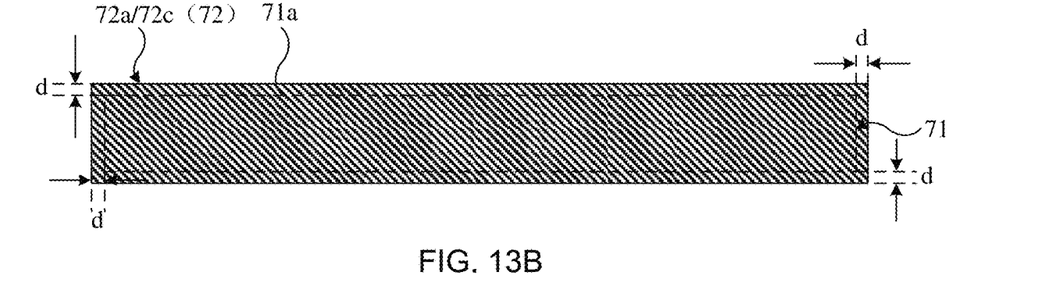
FIG. 13B is a structural diagram of a portion of the backlight module in FIG. 13A, in accordance with some embodiments of the present disclosure.

Referring to FIGS. 13A and 13B, in a case where the polarizer 72 is the iodine-based polarizer 72c or the dye-based polarizer 72a, in a direction perpendicular to an edge of the side face 71a of the light guide plate 71, the edge of the side face 71a of the light guide plate 71 and an edge proximate thereto of the polarizer 72 have a distance d therebetween. The side face 71a of the light guide plate 71 includes four edges, and the polarizer 72 includes four edges. The distance d between each of the four edges of the side face 71a of the light guide plate 71 and a corresponding edge of the polarizer 72 may be the same or different. In a thickness direction of the light guide plate 71, a length of the side face 71a of the light guide plate 71 is generally small, and thus misalignments are likely to occur when the polarizer 72 is attached to the side face 71a of the light guide plate 71. By providing distances each between an edge of the side face 71a of the light guide plate 71 and a corresponding edge of the polarizer 72, even if misalignments occur when the polarizer 72 is attached to the side face 71a of the light guide plate 71, it is possible to be ensured that all of the light incident on the light guide plate 71 from the light source 73 through the polarizer 72 and the side face 71a of the light guide plate 71 is the linearly polarized light.

In some other embodiments, a part of the four edges of the side face 71a of the light guide plate 71 each and a corresponding edge of the polarizer 72 have the distance d therebetween.

In some embodiments, as shown in FIGS. 13A and 13B, the distanced between the edge of the side face 71a of the light guide plate 71 and the edge of the polarizer 72 is greater than or equal to 0.2 mm.

In some embodiments, a thickness of the light guide plate 71 is generally about 2 mm. In a case where the thickness of the light guide plate 71 and misalignments that may occur in a process of attaching the polarizer 72 are taken into account comprehensively, the distance d between the edge of the side face 71a of the light guide plate 71 and the edge of the polarizer 72 is set to be greater than or equal to 0.2 mm.

Figure 14:
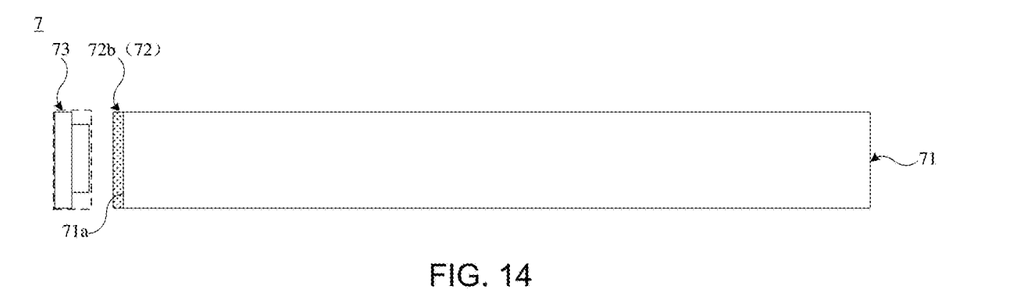
FIG. 14 is a structural diagram of yet another backlight module, in accordance with some embodiments of the present disclosure.

In some embodiments, in a case where the polarizer 72 is a metal wire grid polarizer 72b, as shown in FIG. 14, the metal wire grid polarizer 72b is a metal pattern layer fabricated on the side face 71a of the light guide plate 71.

A process of fabricating the metal pattern layer includes forming a metal film and forming the metal pattern layer by patterning the metal film. In some embodiments, patterning the metal film refers to: coating a photoresist on a surface of the metal film, exposing the photoresist using a mask corresponding to the metal pattern layer, developing the photoresist and etching the metal film to form the metal pattern layer.

It will be understood that, the metal film may be formed by using vacuum magnetron sputtering, which is one of physical vapor deposition (PVD), and the metal film may also be formed by another method such as vacuum evaporation or ion plating, which is not limited in the embodiments of the present disclosure.

In some other embodiments, the metal wire grid polarizer 72b may also be a metal wire grid polarizing plate. In this case, the metal wire grid polarizing plate is adhered to the side face 71a of the light guide plate 71 through an adhesive layer.

In some embodiments, the edge-lit backlight module 7 further includes lamp cover(s) 732 each covering a light-emitting side of a light source 73. As shown in FIGS. 15 to 18, a lamp cover 732 includes a transparent plate 7321 opposite to the light source 73, and a connecting portion 7322 connecting the transparent plate 7321 and the light source 73. The transparent plate 7321 includes an inner side surface 732i proximate to the light source and an outer side surface 732o away from the light source, and the polarizer 72 is fixed on the inner side surface 732i of the transparent plate 7321 or the outer side surface 732o of the transparent plate 7321.

Figure 15:
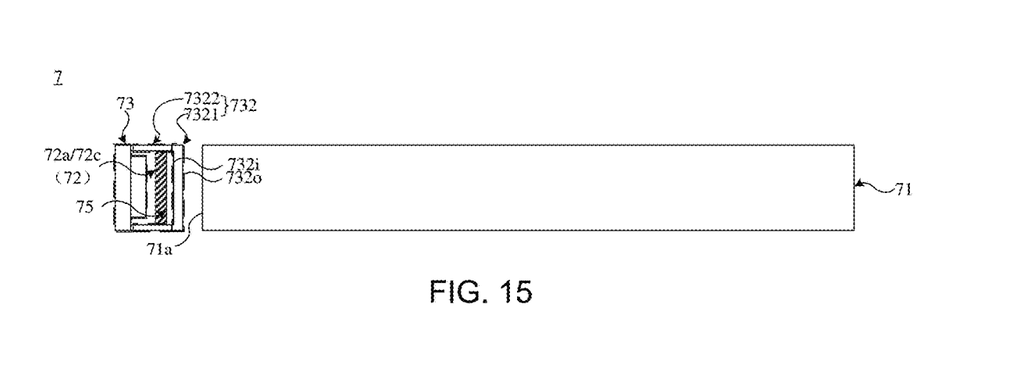
FIG. 15 is a structural diagram of yet another backlight module, in accordance with some embodiments of the present disclosure.
Figure 16:
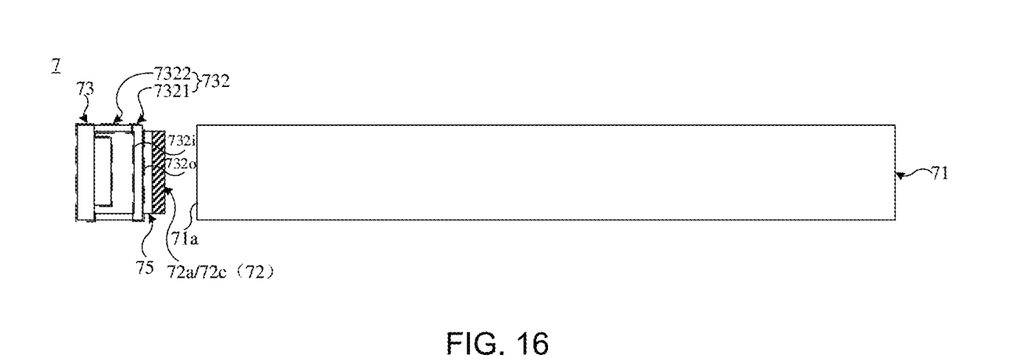
FIG. 16 is a structural diagram of yet another backlight module, in accordance with some embodiments of the present disclosure.
Figure 17:
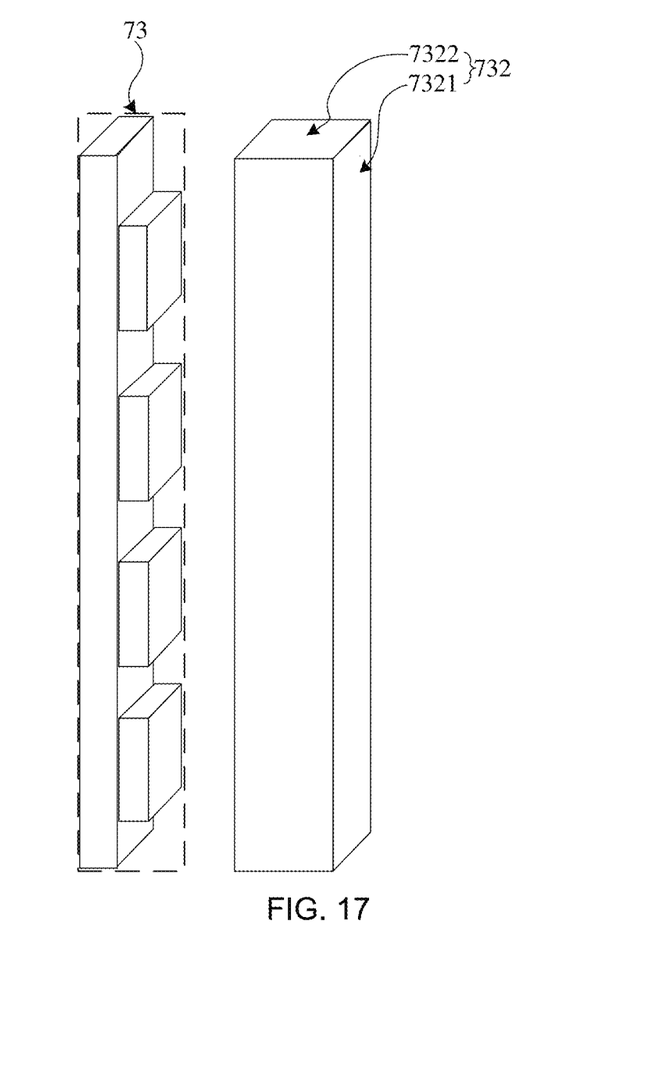
FIG. 17 is a structural diagram of a portion of the backlight module in FIG. 16, in accordance with some embodiments of the present disclosure.
Figure 18:
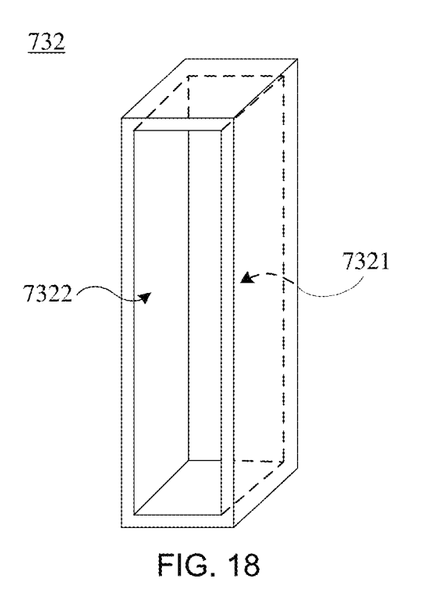
FIG. 18 is a structural diagram of a lamp cover, in accordance with some embodiments of the present disclosure.

In some embodiments, as shown in FIGS. 15 and 16, in the case where the polarizer 72 is the iodine-based polarizer 72c or the dye-based polarizer 72a, the polarizer 72 is adhered to a surface (i.e., the inner side surface 732i) of the transparent plate 7321 proximate to the light source 73 or a surface (i.e., the outer side surface 732o) of the transparent plate 7321 away from the light source 73 through a second adhesive layer 75. The second adhesive layer 75 may include a heat dissipation material. A material and a function of the second adhesive layer 75 are the same or substantially the same as the material and the function of the first adhesive layer 74, which will not be described in detail herein.

In some embodiments, in the case where the polarizer 72 is the iodine-based polarizer 72c or the dye-based polarizer 72a, an orthographic projection of a contour of the transparent plate 7321 on a plane where the polarizer 72 is located is within the range of the contour of the polarizer 72. That is, the polarizer 72 completely covers the transparent plate 7321. Alternatively, the contour of the polarizer 72 coincides with the contour of the transparent plate 7321. On this basis, it may be ensured that all of the light incident on the light guide plate 71 from the light source 73 through the transparent plate 7321 and the polarizer 72 is the linearly polarized light.

In some embodiments, in the case where the polarizer 72 is the metal wire grid polarizer 72b, the metal wire grid polarizer 72b is a metal pattern layer fabricated on the surface of the transparent plate 7321 proximate to the light source 73 or the surface of the transparent plate 7321 away from the light source 73. The process of fabricating the metal pattern layer may be referred to the foregoing description, which will not be described in detail herein.

In some other embodiments, in the case where the polarizer 72 is the metal wire grid polarizer 72b, the metal wire grid polarizer 72b includes a substrate layer and metal grid bars disposed on the substrate layer. The substrate layer may be adhered to the transparent plate 7321 through an adhesive layer. On this basis, the lamp cover 732 may play a role of protecting the light source 73 and concentrating light, thereby improving the utilization rate of the light emitted from the light source 73.

In some embodiments, since a light-emitting diode (LED) has advantages of a small size, a long service life and a high efficiency, the light source 73 may be configured as a LED light bar.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An edge-lit backlight module, comprising:
    a light guide plate having a first bottom surface and a second bottom surface that are arranged opposite to each other, and side faces connecting the first bottom surface and the second bottom surface, wherein the first bottom surface is a light-emitting surface of the light guide plate;
    at least one polarizer, a polarizer of the at least one polarizer being disposed opposite to one side face of the side faces of the light guide plate; and
    at least one light source, a light source of the at least one light source being disposed on a side of the polarizer of the at least one polarizer away from the one side face of the light guide plate, wherein
    the at least one polarizer is configured to convert light emitted from the light source of the at least one light source to the light guide plate into linearly polarized light; and
    the polarizer of the at least one polarizer is one of an iodine-based polarizer, a dye-based polarizer or a metal wire grid polarizer.

2. The edge-lit backlight module according to claim 1, wherein the polarizer of the at least one polarizer is fixed on the one side face of the light guide plate.

3. The edge-lit backlight module according to claim 1, further comprising at least one lamp cover covering a light-emitting side of the light source of the at least one light source, the light-emitting side being a side of the light source of the at least one light source proximate to the one side face of the light guide plate, wherein
    a lamp cover of the at least one lamp cover includes a transparent plate opposite to the light source of the at least one light source covered by the lamp cover of the at least one lamp cover, and a connecting portion connecting the transparent plate with the light source of the at least one light source; the transparent plate includes an inner side surface proximate to the light source of the at least one light source and an outer side surface away from the light source of the at least one light source, and the polarizer of the at least one polarizer disposed between the light guide plate and the light source of the at least one light source covered by the lamp cover of the at least one lamp cover is fixed on the inner side surface or the outer side surface of the transparent plate of the lamp cover of the at least one lamp cover.

4. The edge-lit backlight module according to claim 3, wherein the polarizer of the at least one polarizer is the iodine-based polarizer or the dye-based polarizer, the polarizer of the at least one polarizer is adhered to the inner side surface or the outer side surface of the transparent plate of the lamp cover of the at least one lamp cover through a second adhesive layer, and a material of the second adhesive layer includes a heat dissipation material.

5. The edge-lit backlight module according to claim 3, wherein the polarizer of the at least one polarizer is a metal wire grid polarizer, and the metal wire grid polarizer is a metal pattern layer disposed on the inner side surface or the outer side surface of the transparent plate of the lamp cover of the at least one lamp cover.

6. The edge-lit backlight module according to claim 1, wherein the polarizer of the at least one polarizer is the iodine-based polarizer or the dye-based polarizer, the edge-lit backlight module further comprises a first adhesive layer, the polarizer of the at least one polarizer is adhered to the one side face of the light guide plate through the first adhesive layer, and a material of the first adhesive layer includes a heat dissipation material.

7. The edge-lit backlight module according to claim 1, wherein the polarizer of the at least one polarizer is the iodine-based polarizer or the dye-based polarizer, and an orthographic projection of the one side face of the light guide plate on a plane where the polarizer of the at least one polarizer is located within a range of a contour of the polarizer.

8. The edge-lit backlight module according to claim 7, wherein an orthographic projection of the contour of the polarizer of the at least one polarizer on a plane where the one side face of the light guide plate is located substantially coincides with a contour of the one side face of the light guide plate.

9. The edge-lit backlight module according to claim 7, wherein in a direction perpendicular to an edge of the one side face of the light guide plate, the edge of the one side face of the light guide plate and an edge proximate thereto of the polarizer of the at least one polarizer have a distance therebetween.

10. The edge-lit backlight module according to claim 9, wherein the distance between the edge of the one side face of the light guide plate and the edge proximate thereto of the polarizer of the at least one polarizer is greater than or equal to 0.2 mm.

11. The edge-lit backlight module according to claim 1, wherein the polarizer of the at least one polarizer is the metal wire grid polarizer, the metal wire grid polarizer is a metal pattern layer disposed on the one side face of the light guide plate.

12. The edge-lit backlight module according to claim 1, wherein the light guide plate includes:
   a light guide plate body; and
   a plurality of scattering particles dispersedly disposed in the light guide plate body, the plurality of scattering particles being configured to scatter light.

13. The edge-lit backlight module according to claim 12, wherein a particle size of at least one scattering particle is in a range of 1 nm to 100 nm, inclusive.

14. The edge-lit backlight module according to claim 12, wherein a material of the plurality of scattering particles includes one or more of a metal material, a metal compound material or a nano-polymeric material.

15. The edge-lit backlight module according to claim 1, wherein the light guide plate is transparent.

16. A liquid crystal display apparatus, comprising:
   the edge-lit backlight module according to claim 1;
   a liquid crystal display panel; and
   a polarization analyzer disposed on a side of the liquid crystal display panel away from the edge-lit backlight module, wherein
   the first bottom surface is closer to the liquid crystal display panel than the second bottom surface, and a transmission axis of the polarizer of the at least one polarizer is perpendicular to or parallel to a transmission axis of the polarization analyzer.

17. The edge-lit backlight module according to claim 1, wherein the polarizer of the at least one polarizer is a metal wire grid polarizer, and the metal wire grid polarizer is a metal wire grid polarizing plate adhered to the one side face of the light guide plate.

18. The edge-lit backlight module according to claim 1, wherein the light emitted from the light source of the at least one light source is collimated light, and a propagation direction of the collimated light is parallel to the light-emitting surface of the light guide plate.

19. An edge-lit backlight module, comprising:
   a light guide plate having a first bottom surface and a second bottom surface that are arranged opposite to each other, and side faces connecting the first bottom surface and the second bottom surface, wherein the first bottom surface is a light-emitting surface of the light guide plate;
   at least one polarizer, a polarizer of the at least one polarizer being disposed opposite to one side face of the side faces of the light guide plate;
   at least one light source, a light source of the at least one light source being disposed on a side of the polarizer of the at least one polarizer away from the one side face of the light guide plate;
   at least one lamp cover covering a light-emitting side of the light source of the at least one light source, the light-emitting side being a side of the light source of the at least one light source proximate to the one side face of the light guide plate, wherein
   the at least one polarizer is configured to convert light emitted from the light source of the at least one light source to the light guide plate into linearly polarized light; and
   a lamp cover of the at least one lamp cover includes a transparent plate opposite to the light source of the at least one light source covered by the lamp cover of the at least one lamp cover, and a connecting portion connecting the transparent plate with the light source of the at least one light source; the transparent plate includes an inner side surface proximate to the light source of the at least one light source and an outer side surface away from the light source of the at least one light source, and the polarizer of the at least one polarizer disposed between the light guide plate and the light source of the at least one light source covered by the lamp cover of the at least one lamp cover is fixed on the inner side surface or the outer side surface of the transparent plate of the lamp cover of the at least one lamp cover.

* * * * *